US006582234B1

United States Patent
Montgomery et al.

(10) Patent No.: US 6,582,234 B1
(45) Date of Patent: Jun. 24, 2003

(54) METHOD FOR DEMONSTRATING THE INVERSE SQUARE LAW AND APPARATUS THEREFOR

(76) Inventors: Robert Arthur Montgomery, 4928 Gould Ave., La Canada, CA (US) 91011; Christopher Gordon Snow, 1347 J. Lee Cir., Glendale, CA (US) 91208

( * ) Notice: Subject to any disclaimer, the term of this patent is extended or adjusted under 35 U.S.C. 154(b) by 0 days.

(21) Appl. No.: 10/210,022

(22) Filed: Jul. 31, 2002

(51) Int. Cl.[7] .............................................. G09B 23/06
(52) U.S. Cl. ........................ 434/300; 434/215; 434/276; 434/302
(58) Field of Search ................................ 434/215, 276, 434/300, 302, 401

(56) References Cited

U.S. PATENT DOCUMENTS

| | | | | |
|---|---|---|---|---|
| 720,426 A | * | 2/1903 | Hemenway | 73/382 R |
| 872,325 A | * | 12/1907 | Boyd | 29/235 |
| 3,056,216 A | * | 10/1962 | Singerman | 434/303 |
| 3,656,241 A | * | 4/1972 | Chambers | 434/302 |
| 4,543,067 A | * | 9/1985 | Wallen | 434/300 |
| 5,873,734 A | * | 2/1999 | Griswold et al. | 434/274 |

* cited by examiner

Primary Examiner—Derris H. Banks
Assistant Examiner—Dmitry Suhol

(57) ABSTRACT

The invention is an educational demonstration designed to help students better understand the concepts of torque and the inverse square law. A variable torque pulley consists of a rigid overlapping spiral shape member and a rigid circular member. The circular member is attached to the spiral shaped member as one integral piece, each incorporating a groove around the perimeter to act as a guide for a length of string. The circular member acts as a pulley and the spiral shape member acts as a lever. The variable torque pulley rotates in a circular fashion pivoting on an axle about its center. String is used with the circular member to rotate the apparatus. String is used with the spiral shape member for the hanging of a weight. The axle acts as the fulcrum for the spiral shape member. The shape of the spiral is important because as the variable torque lever rotates, the weight moves toward the fulcrum and the torque drops off in harmony with the inverse square law.

20 Claims, 9 Drawing Sheets

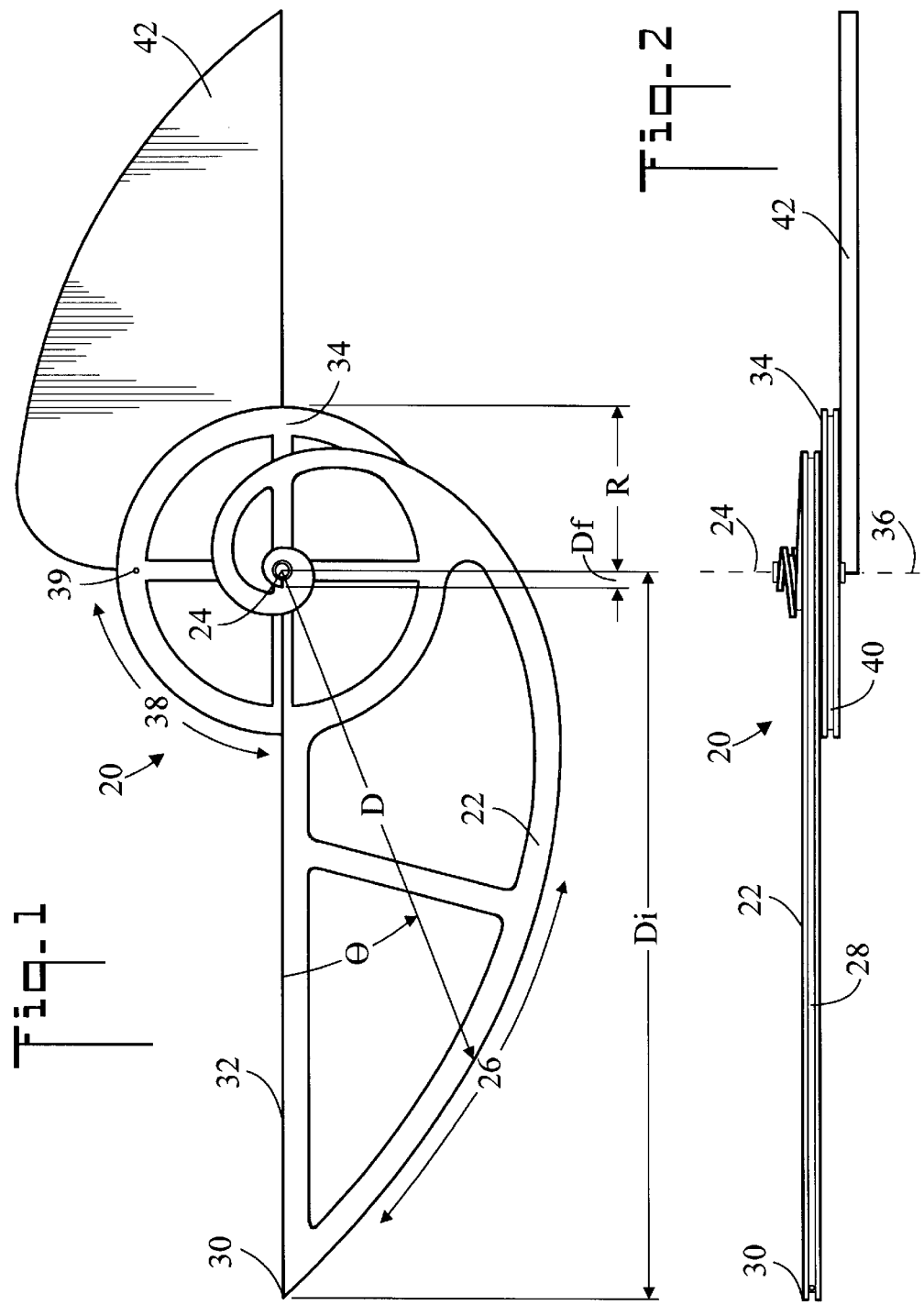

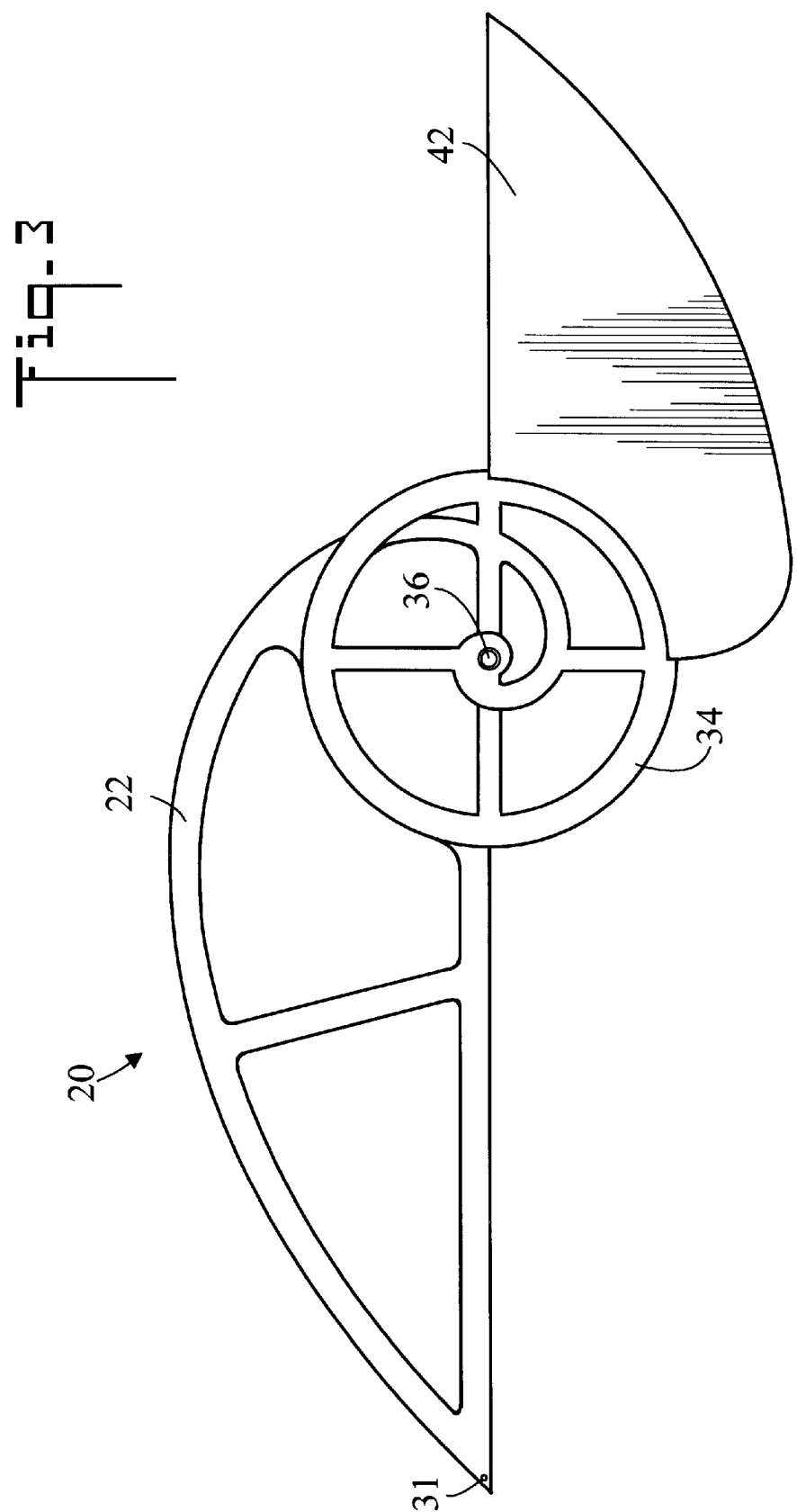

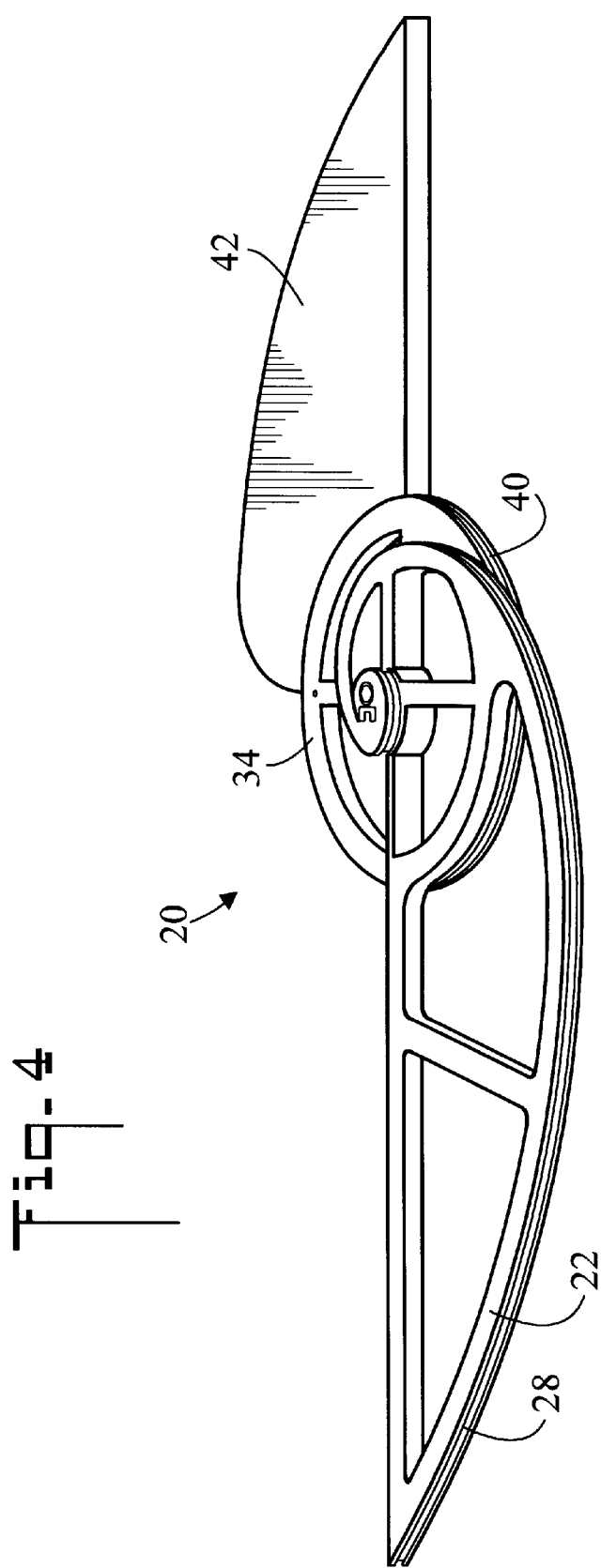

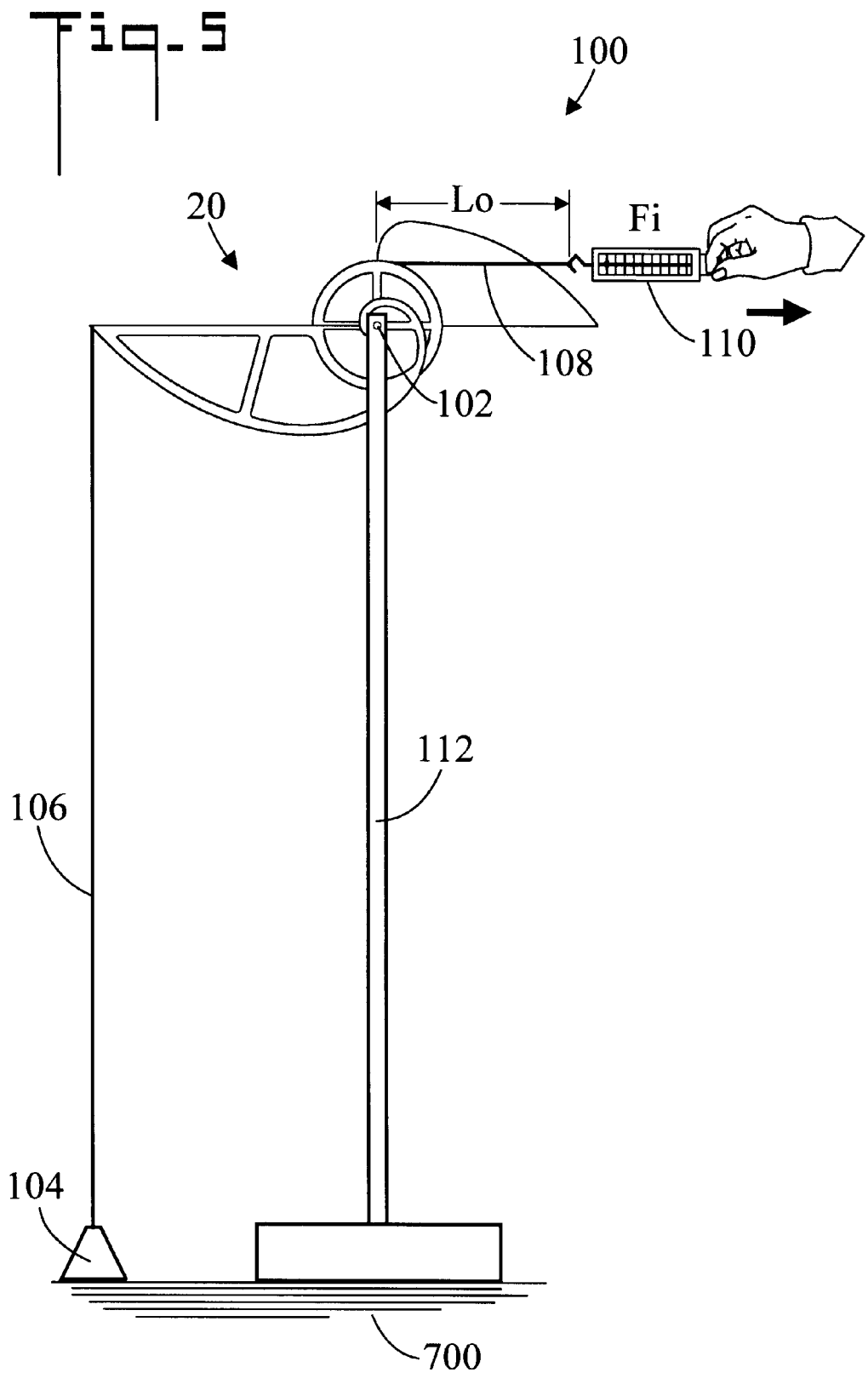
Fig_5

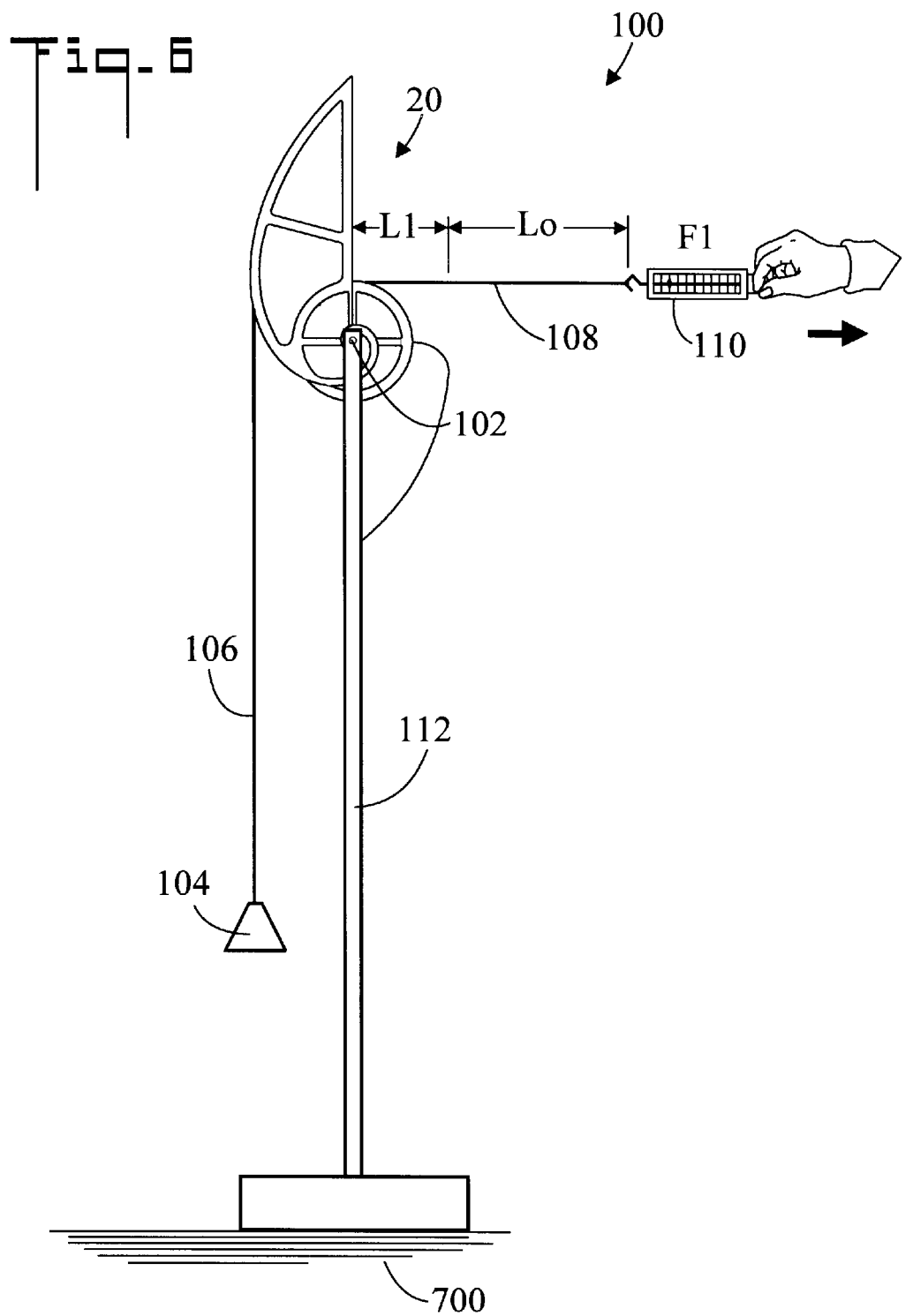

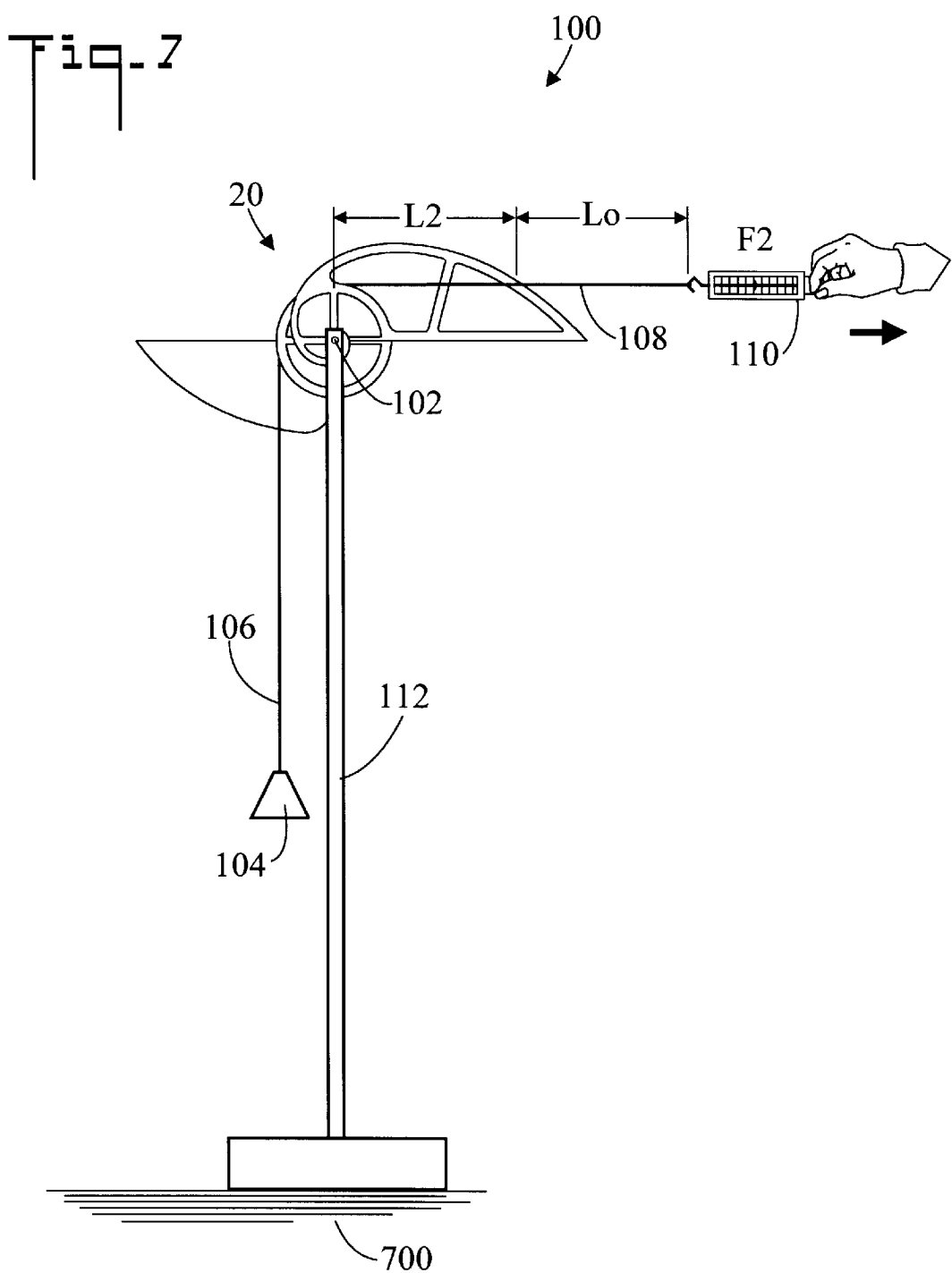

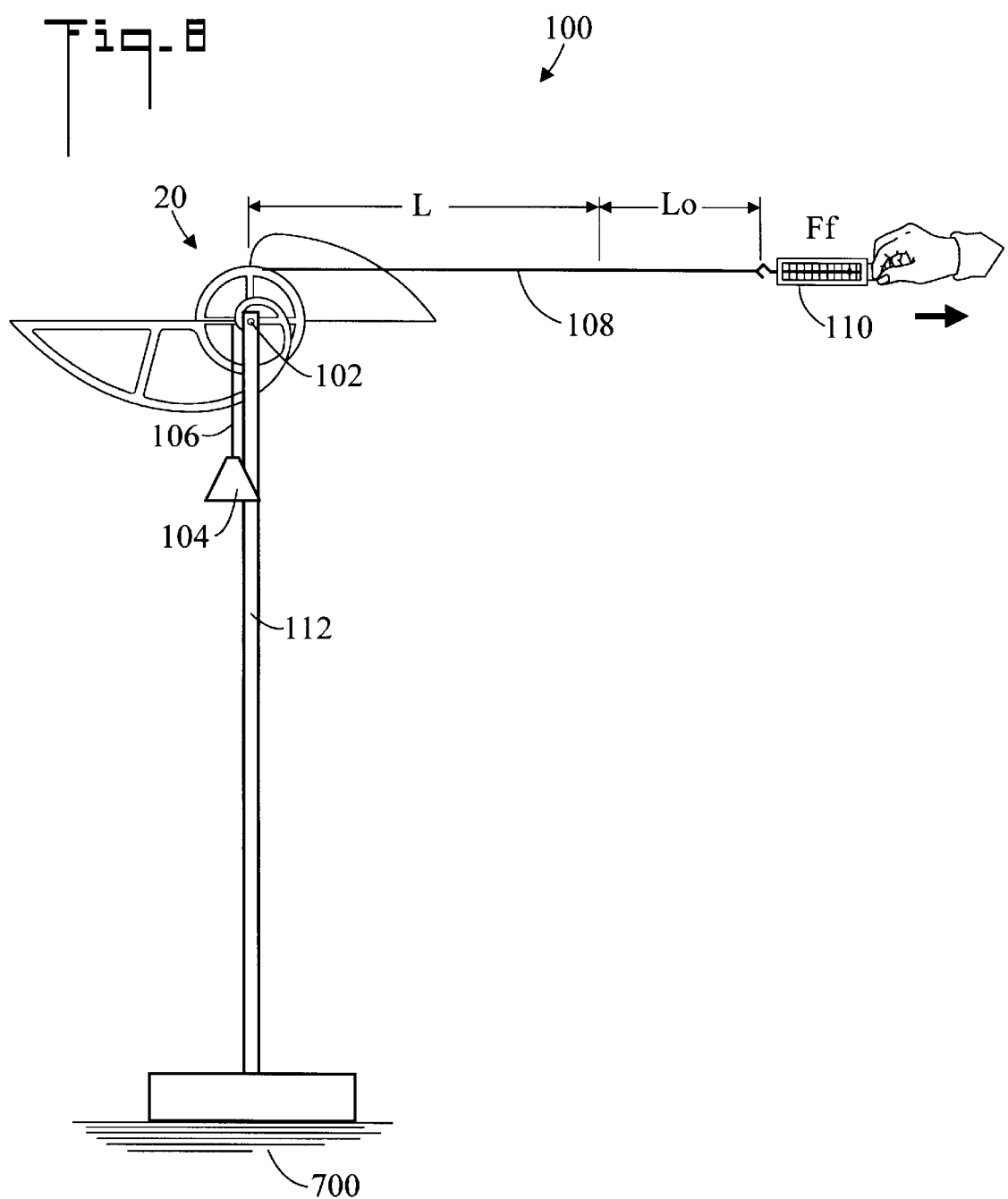

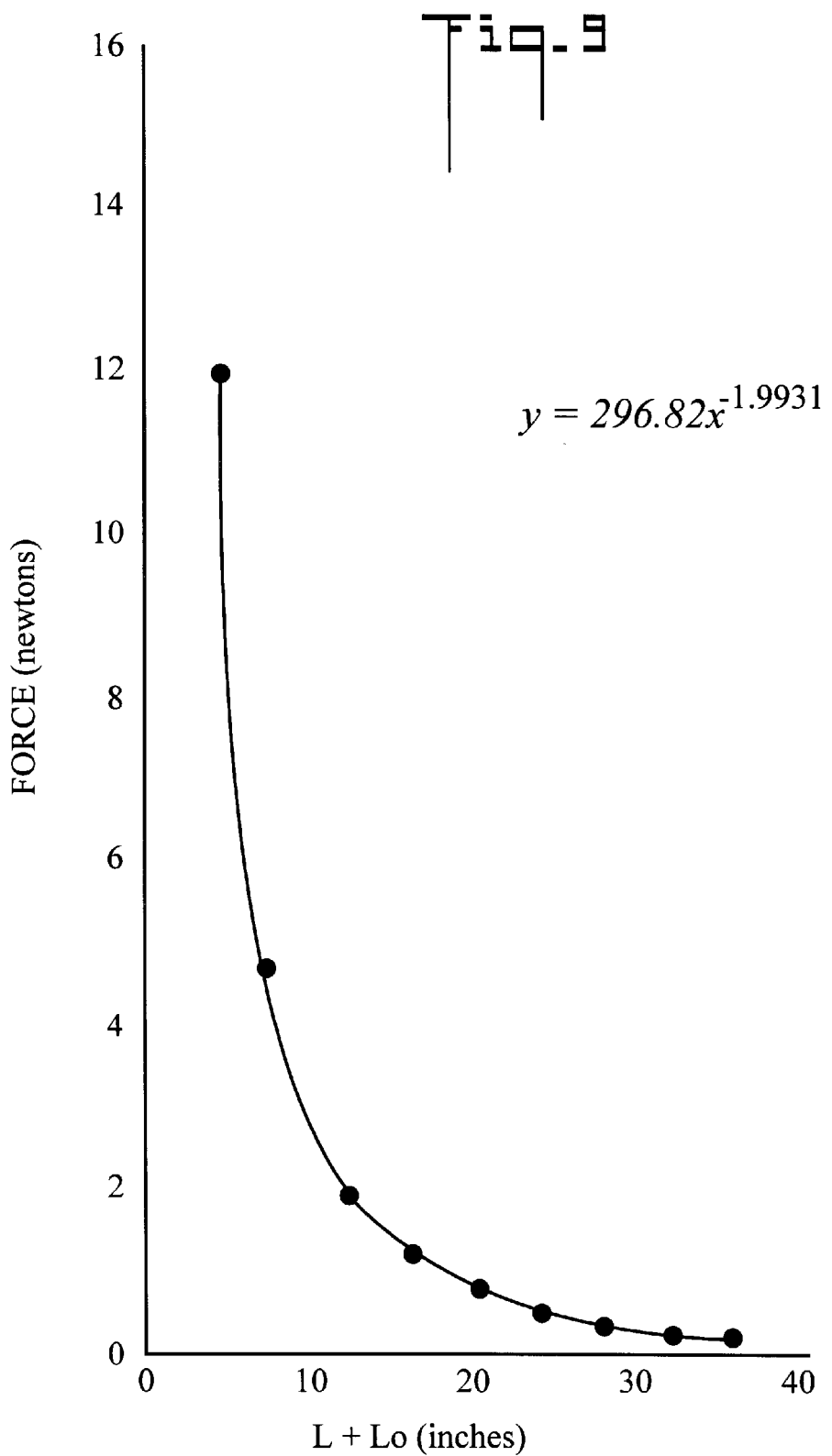

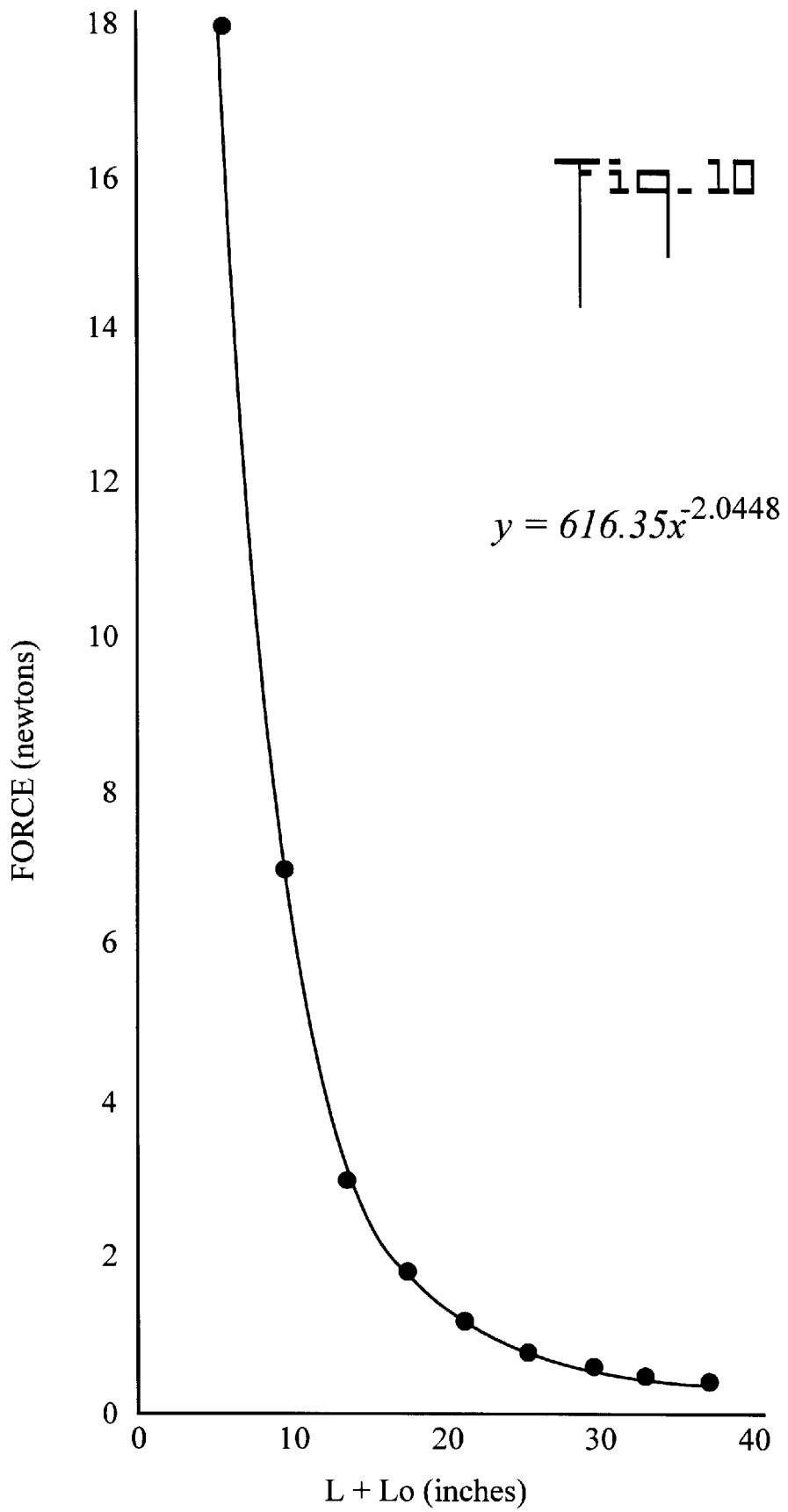

METHOD FOR DEMONSTRATING THE INVERSE SQUARE LAW AND APPARATUS THEREFOR

TECHNICAL FIELD

This invention relates to educational demonstrations, and more specifically to the apparatus of a variable torque pulley which is used to demonstrate the principles of torque and the inverse square law.

BACKGROUND OF THE INVENTION

Essentially the magnitude of all the forces at work, which we experience in our macroscopic world, vary with distance according to the inverse square law, such as the gravitational force, the magnetic force, and the electric force. Some examples of this are the following: The gravitational force between any two objects varies inversely with the square of their separation. The magnetic force between a magnet and a piece of iron varies inversely with the square of their separation. The electromagnetic force that binds atoms and molecules together is an electric force between charged elementary particles such as protons and electrons. This force varies as the inverse square of the separation of the particles. These concepts are abstract and difficult to understand, for it is not easy for most students to visualize this force distance relationship. This invention solves that problem by providing a physical demonstration that students can touch feel and experience for themselves to help them better understand the laws of the natural world.

SUMMARY OF THE INVENTION

In accordance with the present invention a variable torque pulley consists of a rigid overlapping spiral shape member and a rigid circular member. The circular member is attached to the spiral shaped member as one integral piece, each incorporating a groove around the perimeter to act as a guide for a length of string. The circular member acts as a pulley and the spiral shape member acts as a lever. The variable torque pulley rotates in a circular fashion pivoting on an axle about its center. String is used with the circular member to rotate the apparatus. String is also used with the spiral shape member for the hanging of a weight. The axle acts as the fulcrum for the spiral shape member. The shape of the spiral is important because as the variable torque pulley rotates, the weight moves toward the fulcrum and the torque drops off in harmony with the inverse square law. The invention helps students to better understand the concept of the inverse square law by providing a dynamic and tangible demonstration. The demonstration is interactive; such that it allows the student to feel the gravitational force of an object, in this case a weight, change with distance according to the inverse square law. Furthermore the invention allows students to visualize the concept of torque as a vector product consisting of both a force and a length of lever arm as the length of the arm changes. After finishing the experiment, the student can plot what he or she is visualizing and gain important practice with his or her graphing skills.

Other aspects of the present invention will become apparent from the following detailed description, taken in conjunction with the accompanying drawings, which illustrate, by way of example, the principles of the invention.

BRIEF DESCRIPTION OF THE DRAWINGS

FIG. 1 is a side elevation view of a variable torque pulley in accordance with the present invention;

FIG. 2 is an edge view of the variable torque pulley;

FIG. 3 is an opposite side elevation view of the variable torque pulley;

FIG. 4 is a perspective view of the variable torque pulley;

FIG. 5 is a reduced side elevation view of a system for demonstrating the inverse square law;

FIG. 6 is a reduced side elevation view of the system in a second position;

FIG. 7 is a reduced side elevation view of the system in a third position;

FIG. 8 is a reduced side elevation view of the system in a final position;

FIG. 9 is a first graph of force verses length; and,

FIG. 10 is a second graph of force verses length using a heaver weight.

DETAILED DESCRIPTION OF THE INVENTION

A preferred embodiment of the variable torque pulley 20 is illustrated in FIGS. 1 through 4. A variable torque pulley 20 consists of a spiral member 22 and a circular member 34. The spiral member 22 is connected to the circular member 34 so that the first central axis 24 of spiral member 22 is coincident with the second central axis 36 of circular member 34 refer to FIG. 2. Additional material is molded to the circular member 34 to act as a counter weight 42. As the variable torque pulley rotates its center of gravity is always aligned with the central axes 24 and 36. Pro engineering 3D modeling software was used to design the variable torque pulley 20 and to facilitate the correct placement of the center of gravity. In other words the circular member 34 and counter weight 42 is attached to the spiral shaped member 22 all as one integral piece comprising the variable torque pulley 20. The spiral member 22 contains a first line-receiving groove 28 along its first perimeter 26 and the circular member 34 contains a second line-receiving groove 40 around the second perimeter 38. The purpose of the grooves is to provide a guide for the string.

The shape of the spiral member 22 must be derived from calculation to adhere to the inverse square law during operation. We will start with a simplified discussion of torque and move into the equations necessary for the construction of a variable torque pulley 20. The magnitude of the torque is the vector product of the force Mg and the length of a lever arm D. Assume the line of action is perpendicular to the lever arm. Where T is the torque, M is the mass of the weight, g is the acceleration due to gravity and D is the length of the lever arm. This is the definition for torque.

$$T = MgD \quad [1]$$

Notice that D is directly proportional to T. A change in D will cause a corresponding change in T. Because we want the torque to drop off in harmony with the inverse square law we will change the length of the lever arm D. We want D to change with rotation as the inverse square of the angle of rotation θ with respect to a reference line 32, so we write the equation.

$$D = \frac{1}{\theta^2} \quad [2]$$

Next we substitute equation 2 into equation 1 and we get.

$$T = \frac{Mg}{\theta^2} \quad [3]$$

Look back at equation 1 notice again that D is directly proportional to T. α is the symbol use to designate proportionality, so we write.

$$D \alpha T \quad [4]$$

Substituting equation 3 into equation 4 we obtain.

$$D \alpha \frac{Mg}{\theta^2} \quad [5]$$

Because Mg is unknown at this time we will include it in an unknown constant we call C, now the equation becomes.

$$D = \frac{C}{\theta^2} \quad [6]$$

When designing a variable torque pulley we must have a starting point and an ending point; consequently, we must choose a D initial and a D final. For D initial we use the equation.

$$D_i = \frac{C}{(\theta_o)^2} \quad [7]$$

Where $\theta_0$ is the starting angle. For D final we use the equation.

$$D_f = \frac{C}{(\theta_o + 2n\pi)^2} \quad [8]$$

Where n is the number of turns in the spiral and the expression 2nπ is an angle in radians. Rearranging equation 6 we obtain an expression for C.

$$C = D_i(\theta_0)^2 \quad [9]$$

Substituting equation 9 into equation 8 we obtain.

$$D_f = \frac{D_i(\theta_o)^2}{(\theta_o + 2n\pi)^2}$$

Next we solve the equation for $\theta_0$.

$$\sqrt{\frac{D_f}{D_i}} = \frac{\theta_o}{\theta_o + 2n\pi} \quad [10]$$

$$2n\pi\sqrt{\frac{D_f}{D_i}} = \theta_o - \theta_o\sqrt{\frac{D_f}{D_i}}$$

$$2n\pi\sqrt{\frac{D_f}{D_i}} = \theta_o\left(1 - \sqrt{\frac{D_f}{D_i}}\right)$$

$$\theta_o = \frac{2n\pi\sqrt{\frac{D_f}{D_i}}}{1 - \sqrt{\frac{D_f}{D_i}}}$$

Knowing the number of turns in the spiral n, the $D_i$ and $D_f$, we; can find the starting angle by using equation 10.

Referring to FIG. 1, the general equation governing the shape of the spiral is as follows.

$$D = \frac{C}{(\theta_o + \theta)^2} \quad [11]$$

There are an infinite number of possibilities with regard to the size and configuration of the spiral member 22 and the circular member 34. For example the radius of the circular member R in FIG. 1 can be chosen at any convenient size and the spiral member 22 can be designed to rotate around once, twice, three times, or ten times if desirable by changing the value of n. Df and Di can be chosen at any value. For example if $D_i$ is chosen to be 12 inches and $D_f$ is chosen to be 0.237 inches and the variable torque pulley 20 is to rotate around twice n=2 equation 10 is used to find $\theta_0$ having a value of 2.05 radians. Equation 9 is used to find the constant C having a value of 50.66. The values of C and $\theta_0$ are substituted into the general equation 11. D is found for various angles of θ, with respect to reference line 32, in this case from 0 to 4π, producing the shape of the spiral member 22 seen in FIGS. 1 through 4.

The operation and function of the invention is shown by the system 100 for demonstrating the inverse square law illustrated in FIG. 5 through 10. The spiral member 22 contains a through-hole 31 at its distal end 30 for attachment of string. This section of string will be referred to as the first line 106. The circular member 34 contains a though-hole 39 on its second perimeter 38 for the attachment of the second line 108. A force-measuring device 110 such as a spring balance is attached to the end of the second line 108. Any suitable weight 104, also found in most college and high school stock rooms is attached to the end of the first line 106. When selecting a weight, it is recommended not to choose one more then a few pounds, for too much weight will cause unnecessary stress to the bearings. Bearings are press fit into the front and back of the center hole of the variable torque pulley 20. The bearings are of the flanged type to hold them in place. A rigid axle 102 is inserted into the bearings to allow rotation of the torque pulley 20. The axle 102 is clamped to any suitable stand 112, found in most college and high school stock rooms, so that axle 102 is disposed horizontally with respect to the support surface 700. For optimum performance the stand 112 should be no shorter then four feet long. The second line 108 is attached to the circular member 34 by tying a knot on one end and threading it into the through hole 39 contained on the second line receiving groove 40. Because n=2, this second line 108 is rapped twice around the inside of the second line receiving groove 40 contained in the circular member 34. Conversely, One end of the first line 106 is tied in a similar fashion to the through-hole 31 at the distal end 30 of the spiral shape member 22 and the other end is tied to a weight 104. The weight 104 rests on a suitable support surface 700 such as a tabletop or the floor of the classroom. The second line 108 is pulled in the direction of the arrow causing the variable torque pulley 20 to rotate. The first line 106 is guided by the first line-receiving groove 28 and the weight 104 is lifted upward. The point when the weight 104 just lifts off the support surface 700 is measured by the force-measuring device 110 as force initial $F_i$ in FIG. 5. The equations governing the operation and function of the invention are similar to the equations discussed above. The difference is that the angle of rotation $\theta_0$ and θ is replaced with a length of string Lo and L and $D_i$ and $D_f$ are replaced with $F_i$ and $F_f$. R is the radius of the circle.

$$F_i = \frac{C}{(L_o)^2} \quad [12]$$

$$C = (F_i)L_o^2 \quad [13]$$

$$F_f = \frac{C}{(L_o + 2n\pi R)^2} \quad [14]$$

$$L_o = \frac{2n\pi R \sqrt{\frac{F_f}{F_i}}}{1 - \sqrt{\frac{F_f}{F_i}}} \quad [15]$$

$$F = \frac{C}{(L_o + L)^2} \quad [16]$$

Variable torque pulley 20 continues to rotate in a circular fashion pivoting on the axle 102 about its center. The axle 102 acts as the fulcrum for the spiral member 22. The weight 104 moves toward the fulcrum effectively decreasing the length of the lever arm D. The force felt and recorded on the force measuring device 110 drops off in harmony with the inverse square law as the length L of the second line 108 increases. FIG. 6 illustrates the variable torque pulley 20 rotated clockwise 90 degrees or ($\pi/2$ radians) from its original position shown in FIG. 5. FIG. 7 shows the rotation at 180 degrees ($\pi$ radians) of rotation. FIG. 8 illustrates 720 degrees or ($4\pi$ radians) of rotation at which point $F_f$ is read from the force-measuring device 110. FIG. 9 represents a graph where the force read from the force-measuring device 110 is plotted against the length ($L_o$+L) of the second line 108 at 90-degree intervals. FIG. 10 is the same graph as FIG. 9 yet a heaver weight 104 is used. For example, referring to FIGS. 5, 6, 7, and 8, if Fi is read from the force measuring device to be 12 Newtons and Ff is read to be 0.2 Newtons and the radius of the circle R=2.5 inches, and n=2 then equation 15 can be used to calculate $L_o$=4.66. Knowing $L_o$ and $F_i$ equation 13 can be used to calculate the constant C=260.59. The length of the second line 108 is measured with a ruler at each interval and recorded with its corresponding force read from the force-measuring device 110. The graphs shown in FIGS. 9 and 10 are actual experimental results obtained by using this method with one of our prototypes. Table 1 refers to FIG. 9 and table 2 refers to FIG. 10.

TABLE 1

|  | L (inches) | L + Lo (inches) | F (newtons) |
|---|---|---|---|
| Lo = 4.66" | 0 | 4.66 | 12 |
| Fi = 12(N) | 3.93 | 8.59 | 4.7 |
| Ff = .2(N) | 7.85 | 12.51 | 1.9 |
| C = 260.59 | 11.78 | 16.44 | 1.2 |
|  | 15.7 | 20.36 | .8 |
|  | 19.63 | 24.29 | .5 |
|  | 23.55 | 28.21 | .39 |
|  | 27.48 | 32.14 | .3 |
|  | 31.4 | 36.06 | .2 |

TABLE 2

|  | L (inches) | L + Lo (inches) | F (newtons) |
|---|---|---|---|
| Lo = 5.50" | 0 | 5.5 | 18 |
| Fi = 18(N) | 3.93 | 9.43 | 7 |
| Ff = .4(N) | 7.85 | 13.35 | 3 |

TABLE 2-continued

|  | L (inches) | L + Lo (inches) | F (newtons) |
|---|---|---|---|
| C = 545.22 | 11.78 | 17.28 | 1.8 |
|  | 15.7 | 21.2 | 1.2 |
|  | 19.63 | 25.13 | .8 |
|  | 23.55 | 29.05 | .6 |
|  | 27.48 | 32.98 | .5 |
|  | 31.4 | 36.9 | .4 |

When comparing the experimental results with the expected results, it is important to take note of some possible sources of error. The force-measuring device 110 in this case a spring balance was used to achieve the results represented in FIG. 9 and 10. This spring balance is an economy model mechanical type spring balance found in most high school and college stock rooms. The balance was high in friction and low in precision. Although the experimental results are close to the expected results greater accuracy can be achieved by using a digital balance. The equation at the top of the graphs shown in FIGS. 9 and 10 is the equation of the curve representing the experimental results in the form shown below.

$$Y = \frac{C}{X^2}$$

An excel spread sheet was used to find this equation. Y is the force and X is the length of the second line 108 L+$L_o$. The student may now experience several physical laws once taught only on the chalkboard as a rather abstract principle.

In terms of use, a method for demonstrating the inverse square law, includes:

(a) providing a system 100 for demonstrating the inverse square law, including:
    a variable torque pulley 20 for demonstrating the inverse square law, the variable torque pulley 20 including:
        a spiral member 22 having a first central axis 24 and a first perimeter 26, a first line-receiving groove 28 disposed around the first perimeter 28, and a distal end 30;
        the first perimeter 26 defined by an equation D$\alpha 1/\theta^2$, where D is a distance from any point on the first perimeter 26 to the first central axis 24, and $\theta^2$ is the square of an angle $\theta$ formed by (1) a line between point D and the central axis 24, and (2) a reference line 32;
        a circular member 34 having a second central axis 36 and a second perimeter 38, a second line-receiving groove 40 disposed around the second perimeter 38;
        the spiral member 22 connected to the circular member 34 so that the first central axis 24 is coincident with the second central axis 36;
        a counter weight 42 connected to the circular member 34, so that a center of gravity of variable torque pulley 20 aligns with first 24 and second 36 central axes.
        an axle 102 disposed along first 24 and second 36 central axes so that variable torque pulley 20 may rotate around axle 102;
    a weight 104;
    a first line 106 having a first end and a second end;
    a second line 108 having a first end and a second end;
    a force measuring device 110 having a first end and an opposite second end;

(b) connecting first end of first line 106 to distal end 30 of spiral member 22;

(c) connecting second end of first line 106 to weight 104;

(d) connecting first end of second line 108 to second perimeter 38 of circular member 34;

(e) connecting second end of second line 108 to said first end of force measuring device 110;

(f) placing second line 108 in second line-receiving groove 40 and wrapping second line 108 around second perimeter 40 of circular member 34; and, (g) pulling second end of force measuring device 110, thereby causing variable torque pulley 20 to rotate about axle 102, and causing first line 106 to be received by first line-receiving groove 28 and wrap around first perimeter 26 of spiral member 22 and thereby lift weight 104, and causing force measuring device 110 to measure a force.

The method further includes:

in step (a), first perimeter 26 extending around first central axis 24 for 720°.

The method further includes:

in step (a), D at distal end 30 being about 12 inches.

The method further including:

in step (a), circular member 34 having a radius R; and, R being about 2.5 inches.

The method further including:

in step (a), a stand 112 having a bottom connected to axle 102, so that the bottom of stand 112 may be placed upon a support surface 700, thereby carrying variable torque pulley 20 so that axle 102 is disposed horizontally.

The method further including:

in step (a), wherein $D=C/(\theta_0+\theta)^2$, with C and $\theta_0$, being derived constants.

The method further including:

in step (g), the force measuring device 110 measuring a force according to the equation $F=C/(L+Lo)^2$, wherein F is force, L is a length of pull, and C and Lo are derived constants.

The preferred embodiments of the invention described herein are exemplary and numerous modifications, dimensional variations, and rearrangements can be readily envisioned to achieve an equivalent result, all of which are intended to be embraced within the scope of the appended claims.

We claim:

1. A method for demonstrating the inverse square law, comprising:

(a) providing a system for demonstrating the inverse square law, including:

a variable torque pulley for demonstrating the inverse square law, said variable torque pulley including:

a spiral member having a first central axis and a first perimeter, a first line-receiving groove disposed around said first perimeter, and a distal end;

said first perimeter defined by an equation $D\alpha 1/\theta^2$, where D is a distance from any point on said first perimeter to said first central axis, and $\theta^2$ is the square of an angle $\theta$ formed by (1) a line between said point D and said central axis, and (2) a reference line;

a circular member having a second central axis and a second perimeter, a second line-receiving groove disposed around said second perimeter;

said spiral member connected to said circular member so that said first central axis is coincident with said second central axis;

a counter weight connected to said circular member, so that a center of gravity of said variable torque pulley aligns with said first and second central axes.

an axle disposed along said first and second central axes so that said variable torque pulley may rotate around said axle;

a weight;

a first line having a first end and a second end;

a second line having a first end and a second end;

a force measuring device having a first end and an opposite second end;

(b) connecting said first end of said first line to said distal end of said spiral member;

(c) connecting said second end of said first line to said weight;

(d) connecting said first end of said second line to said second perimeter of said circular member;

(e) connecting said second end of said second line to said first end of said force measuring device;

(f) placing said second line in said second line-receiving groove and wrapping said second line around said second perimeter of said circular member; and, (g) pulling said second end of said force measuring device, thereby causing said variable torque pulley to rotate about said axle, and causing said first line to be received by said first line-receiving groove and wrap around said first perimeter of said spiral member and thereby lift said weight, and causing said force measuring device to measure a force.

2. The method according to claim 1, further including:

in step (a), said first perimeter extending around said first central axis for 720°.

3. The method according to claim 1, further including:

in step (a), D at said distal end being about 12 inches.

4. The method according to claim 1, further including:

in step (a), said circular member having a radius R; and, R being about 2.5 inches.

5. The method according to claim 1, further including:

in step (a), a stand having a bottom connected to said axle, so that said bottom of said stand may be placed upon a support surface, thereby carrying said variable torque pulley so that said axle is disposed horizontally.

6. The method according to claim 1, further including:

in step (a), wherein $D=C/(\theta_0+\theta)^2$, with C and $\theta_0$, being derived constants.

7. The method according to claim 1, further including:

in step (g), said force measuring device measuring a force according to the equation $F=C/(L+Lo)^2$, wherein F is force, L is a length of pull, and C and Lo are derived constants.

8. A variable torque pulley for demonstrating the inverse square law, comprising:

a spiral member having a first central axis and a first perimeter, a first line-receiving groove disposed around said first perimeter;

said first perimeter defined by an equation $D\alpha 1/\theta^2$, where D is a distance from any point on said first perimeter to said first central axis, and $\theta^2$ is the square of an angle $\theta$ formed by (1) a line between said point D and said central axis, and (2) a reference line;

a circular member having a second central axis and a second perimeter, a second line-receiving groove disposed around said second perimeter;

said spiral member connected to said circular member so that said first central axis is coincident with said second central axis; and, a counter weight connected to said circular member, so that a center of gravity of said variable torque pulley aligns with said first and second central axes.

9. A variable torque pulley according to claim 8, further including:

said first perimeter extending around said first central axis for 720°.

10. A variable torque pulley according to claim 8, further including:

said spiral member having a distal end; and,

D at said distal end being about 12 inches.

11. A variable torque pulley according to claim 8, further including:

said circular member having a radius R; and,

R being about 2.5 inches.

12. A variable torque pulley according to claim 8, further including:

an axle disposed along said first and second central axes so that said variable torque pulley may rotate around said axle.

13. A variable torque pulley according to claim 12, further including:

a stand having a bottom connected to said axle, so that said bottom of said stand may be placed upon a support surface, thereby carrying said variable torque pulley so that said axle is disposed horizontally.

14. A variable torque pulley according to claim 8, wherein $D=C/(\theta_{0+\theta})^2$, with C and $\theta_0$ being derived constants.

15. A system for demonstrating the inverse square law, comprising:

a variable torque pulley for demonstrating the inverse square law, including:

a spiral member having a first central axis and a first perimeter, a first line-receiving groove disposed around said first perimeter, and a distal end;

said first perimeter defined by an equation $D\alpha 1/\theta^2$, where D is a distance from any point on said first perimeter to said first central axis, and $\theta^2$ is the square of an angle $\theta$ formed by (1) a line between said point D and said central axis, and (2) a reference line;

a circular member having a second central axis and a second perimeter, a second line-receiving groove disposed around said second perimeter;

said spiral member connected to said circular member so that said first central axis is coincident with said second central axis;

a counter weight connected to said circular member, so that a center of gravity of said variable torque pulley aligns with said first and second central axes.

an axle disposed along said first and second central axes so that said variable torque pulley may rotate around said axle;

a weight;

a first line having a first end and a second end;

said first end of said first line connected to said distal end of said spiral member;

said second end of said first line connected to said weight;

a force measuring device having a first end and an opposite second end;

a second line having a first end and a second end;

said first end of said second line connected to said second perimeter of said circular member;

said second end of said second line connected to said first end of said force measuring device; and, so that said second line may be placed in said second line-receiving groove and wrapped around said second perimeter of said circular member and said second end of said force measuring device pulled, thereby causing said variable torque pulley to rotate about said axle, and causing said first line to be received by said first line-receiving groove and wrap around said first perimeter of said spiral member and thereby lift said weight, and causing said force measuring device to measure a force.

16. A system according to claim 15, further including:

said first perimeter extending around said first central axis for 720°.

17. A system according to claim 15, further including:

D at said distal end being about 12 inches.

18. A system according to claim 15, further including:

said circular member having a radius R; and,

R being about 2.5 inches.

19. A system according to claim 15, further including:

a stand having a bottom connected to said axle, so that said bottom of said stand may be placed upon a support surface, thereby carrying said variable torque pulley so that said axle is disposed horizontally.

20. A device according to claim 15, wherein $D=C/(\theta_{0+\theta})^2$, with C and $\theta_0$ being derived constants.

* * * * *